(12) United States Patent
Zhang et al.

(10) Patent No.: US 6,594,616 B2
(45) Date of Patent: Jul. 15, 2003

(54) SYSTEM AND METHOD FOR PROVIDING A MOBILE INPUT DEVICE

(75) Inventors: Zhengyou Zhang, Redmond, WA (US); Ying Shan, Plainsboro, NJ (US); Steven A. N. Shafer, Seattle, WA (US); Ying Wu, Champaign, IL (US)

(73) Assignee: Microsoft Corporation, Redmond, WA (US)

(*) Notice: Subject to any disclaimer, the term of this patent is extended or adjusted under 35 U.S.C. 154(b) by 24 days.

(21) Appl. No.: 09/884,343

(22) Filed: Jun. 18, 2001

(65) Prior Publication Data

US 2003/0004678 A1 Jan. 2, 2003

(51) Int. Cl.$^7$ ............................................. G06F 15/00
(52) U.S. Cl. ................................................... 702/152
(58) Field of Search ............................... 702/152, 150, 702/153, 186; 359/630; 345/625

(56) References Cited

U.S. PATENT DOCUMENTS

2002/0186351 A1 * 12/2002 Gnanamgari et al. ......... 353/42

OTHER PUBLICATIONS

T. Starner, S. Mann, B. Rhodes, J. Levine, J.Healey, D. Kirsch, R.W. Picard and A. Pentland. Augmented Reality through Wearable Computing, Presence, Special Issue on Augmented Reality, 6(4), 1997.

Coutaz, Crowley, J.L. and F.Berard. Things that See: Machine Perception in Human Computer Interaction. Communications of the ACM, 43(3): 54–64, 2000.

* cited by examiner

*Primary Examiner*—Michael Nghiem
(74) *Attorney, Agent, or Firm*—Lyon & Harr, LLP; Katrina A. Lyon (57) ABSTRACT

A vision-based gesture interface system, which employs an arbitrary quadrangle-shaped panel and a pointer tip like a fingertip as an intuitive input device. Taking advantage of the panel, the system can fulfill many tasks such as controlling a remote and large display, and simulating a physical keyboard. Users can naturally use their fingers and other pointer tips to issue commands and type texts. The system is facilitated by accurately and reliably tracking the panel and the pointer tip and detecting clicking and dragging actions.

41 Claims, 9 Drawing Sheets

SYSTEM AND METHOD FOR PROVIDING A MOBILE INPUT DEVICE

BACKGROUND OF THE INVENTION

1. Technical Field

The system and method according to the present invention employs an arbitrary quadrangle-shape panel and a pointer tip like a fingertip as an intuitive input device to a remote display.

2. Background Art

The exploration of vision-based interfaces is motivated by the unnaturalness of some of the conventional input devices such as mice and joysticks. The bottleneck of such devices comes from the lack of flexibility due to the constraints from the environment, and the lack of the feeling of immersiveness in human computer interaction. Magnetic sensors and transmitters could be a remedy for such conventional interaction devices. However, they are prone to magnetic interferences and many people are reluctant to use them due to the debate that they could be a health hazard. On the other hand, combined with human body motion, a vision-based interface is of great potential because it provides a non-invasive way to achieve natural and immersive interaction between human and the computer.

There are many applications, such as in smart rooms and teleconferencing, where conventional mice and keyboards turn out to be not suitable because only one person can use them if there are several people in the room. This motivates the development of a vision-based gesture interface. One of the most intuitive and convenient ways to control an intelligent environment is to employ human body motion, especially hand/finger motion. The use of hand gestures has become an important part of Human Computer Interfaces (HCI) in recent years. In order to use the human hand as a natural interface device, some alternatives, such as glove-based devices, have been used to capture human hand motion by attaching some sensors to measure the joint angles and spatial positions of hands directly. Unfortunately, such devices are expensive and cumbersome. Vision-based techniques provide a promising alternative to this goal, since they can be very cost-efficient and non-invasive.

There have been many implemented vision-based application systems in domains such as virtual environments, human-computer interfaces, teleconferencing, sign language translation, etc. However, few of such vision-based interfaces are able to achieve accurate display control and text input. One of the reasons is that such systems are not facilitated with robust, accurate and fast hand/finger tracking using live video inputs. Two dimensional (2D) tracking has been used and has been based on several different cues, such as, for example, color, motion, and image features. Although color tracking provides a cost-efficient way for tracking, it is prone to lighting changes and it is not suitable for accurate tracking. Tracking using image features such as geometric shapes may provide accurate tracking results but may require extensive processing resources.

SUMMARY

The system and method according to the present invention seeks to solve the aforementioned problems by using an arbitrary quadrangle-shaped plane object, such as a paper, and a pointer tip, such as a fingertip or a pen, to serve as a natural and convenient input device for accurately controlling one or more remote displays, based on computer vision techniques.

Functionally, the system consists of panel tracking, pointer tip tracking, homography calculation/updating and action detection/recognition. In the most general terms, video sequences taken by a camera which captures the movement of both the quadrangular panel and pointer are analyzed by a panel tracker and a pointer tip tracker. The panel can be anything as long as it is quadrangle-shaped and relatively rigid.

The setting of the camera can be quite flexible. The camera can be located anywhere as long as the panel is not completely occluded. For instance, it is possible to mount the camera on the ceiling. The user can rotate, translate and tilt the panel to reach a comfortable pose for use. Under some circumstances when the user wants to walk around, a camera can be mounted on top of his head by wearing a hat, or on his shoulders, such that the user can be anywhere to interact with the computer.

Since an arbitrarily quadrangle-shaped panel is used to control the cursor position on the remote computer display, one must know the mapping between a point on the panel and a point on the display. Furthermore, what is available is an image sequence of the panel which may undergo arbitrary motion (as long as the image of the panel does not degenerate into a line or a point), so the mapping between a point in the image plane and a point on the panel must also be known. It is assumed that the camera performs a perspective projection (pinhole model). As the display, the panel, and the image plane are all planes, both above relationships can be described by a plane perspectivity.

The mapping between the image of the panel and the remote display can be described by a homography matrix once the four corners of the panel are located in the image. As the dimensions of the display are known, the homography can be computed by mapping each corner of the panel to a corner of the remote display.

A panel tracker tracks an arbitrary quadrangle-shaped plane object by outputting the positions of its four corners. An edge-based dynamical programming technique is employed in the panel tracker to locate these four corners. The edge-based programming technique employs a gradient of color intensity to locate the edges, since the difference in color intensity between the surroundings and the panel should typically be significant. This technique is quite robust and reliable, even if some of the corners of the panel or part of the edges are occluded. At the same time, since the positions of the corners are calculated by intersecting four lines of the quadrangle, the positions can be calculated in sub-pixels, which allows for more accurate calculation of the homography which describes the mapping between the panel and the remote display. Through this homography, any point on the panel is mapped to the corresponding position on the remote display.

The system and method according to the present invention determines the location of a pointer tip by using a conic curve fitting technique. Since users can use their fingertip to control a cursor on a remote display, the tracking of the pointer tip should be as accurate and stable as possible. This is because a small error in the tip position will be magnified in the remote display. For instance, it is assumed that the resolution of input video is 320×240 pixels and the remote display has a reduction of 1024×768 pixels. Since generally the panel in the image is roughly half the size of the image, a tracking error of 1 pixel will incur about 6 pixels of error in the remote display, which will make the mapped cursor position very shaky. This problem of the magnified tip position error is solved by fitting an ellipse to the edge pixels representing the outline of the pointer as observed in the image. The use of an ellipse to find the pointer tip allows the tip position to be calculated in sub-pixels. This minimizes any error in the tip position once projected in the remote display.

The system allows arbitrary pointer tips, such as fingertips and pens, to be used as long as their color is distinguishable from the panel's color. Basically, the edge points of the pointer tip are held to be those areas where the color of the image of the panel changes significantly. Once the edge points are found, an elliptical curve is fit to the edge points via a conventional curve-fitting technique. The tip of the pointer is then found by finding where the major axis of the ellipse intersects the aforementioned ellipse.

To reduce the processing necessary to locate the pointer tip, two methods can be used. The first is a Kalman filtering technique and the second is a background subtraction technique. The Kalman filtering technique can be employed to predict the tip position $\bar{p}(t+1)$ at time t=1, assuming the position of the tip at time t is p(t). In a small window, for example 30×30 pixels, as many edge points as possible are identified that probably belong to the edge of the tip. This is accomplished by thresholding the gradient and taking advantage of the color of the previous edge of the tracked tip. After that, an ellipse can be fit to these edge points as discussed above to find the exact location of the tip $\bar{p}(t+1)$ for time t+1. Alternately, finding the location of the pointer tip can be expedited by a re-initialization technique that employs a background subtraction technique. The background consists of the panel and the rest of the image and the foreground consists of the pointer. To achieve this result a previous image is subtracted from a current image to localize the pointer. This technique localizes the moving part of the pointer to allow the system to predict where the pointer tip location is. The previously described homography is used to predict the tip location and search for pointer tip edge points in that neighborhood (i.e., 30×30 pixels around the predicted tip point location in a tested embodiment).

The current system simulates the clicking/pressing gestures typical of using a mouse by holding the pointer tip on a position on the panel for a prescribed period of time. A message generator in the system gets inputs from an action detector, and issues various mouse and keyboard events according to the different user input methods. Building on these techniques, the system is capable of performing two types of input: virtual mouse and virtual keyboard. The position of the pointer tip can be mapped to the remote display such that a cursor can be simulated. A paper with a keyboard pattern printed on it can also be used as a virtual keyboard, by which users can point the keys on the paper to input texts.

The present invention supports two "mouse button" pressing modes (clicking mode and dragging modes) and two "mouse motion" types (absolute type and relative type).

As for the two mouse button pressing modes: mode I (clicking mode) simulates the left button down then up automatically and mode II (dragging mode) simulates the left button down until released. In one embodiment, clicking/pressing is simulated by holding the pointer tip in position for a period of time, say 1 second. A state variable S maintains two states: UP and DN (down), to simulate the two natural states of a button.

The variable S is initialized to be UP. In the clicking mode (mode I), when the system detects that the pointer tip has been at a fixed place for, say, 1 second (or other pre-specified duration), the state variable S is set to DN. After 0.1 second, the state variable S will be automatically set to UP to simulate button release. Appropriate mouse events are generated, and a clicking action is performed.

The clicking mode (mode I) has very limited ability of dragging, since the release is automatic. To simulate dragging, mode II uses another state variable, D, to memorize the flip of clicking. When the system detects that the pointer tip has been at a fixed place for, say, 1 second (or other pre-specified duration), variable D changes its state (from D UP to D DN or from D DN to D UP). When the D-state change from D UP to D DN is detected, a pressing action is detected; when the D-state change from D DN to D UP is detected, a releasing action is detected. Thus, an object can be selected and dragged to a different place.

The system can also simulate two mouse motion types: absolute and relative. In the absolute type, the panel will be mapped to the whole remote display, such that each point in the panel will be mapped to the corresponding point in the display. As previously discussed, this type needs very accurate tracking, since a small tracking error of the panel and pointer tip will be magnified. However, the absolute type is more intuitive.

An alternative type based on relative motion is also provided, which is much less sensitive to the tracking accuracy, since the cursor is controlled by the relative motion of the pointer tip. Assume the motion direction of pointer tip is $d_p(t)$ at time t. The moving direction of the cursor will be $$d_d(t)=H(t)d_p(t).$$

The speed of cursor motion is determined by the velocity of the pointer tip, i.e., $$\Delta_d=\alpha\|v_p\|,$$

where α controls the scale of the cursor speed on the display. The relative type incurs much smooth movement of the cursor with small α, due to the non-magnification of tracking error. There could be many other alternatives of relative motion. For instance, the panel can be just mapped to a window area centered at previous cursor position on the remote display. In this method, the center of the panel corresponds to the previous cursor position. When the pointer tip moves from center to left, the cursor will move left. Obviously, the window area could be smaller than the panel in the image, such that the tracking error can be even minimized.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which is shown by way of illustration of specific embodiments in which the invention may be practiced. It is understood that other embodiments may be utilized and structural changes may be made without departing from the scope of the present invention.

Exemplary Operating Environment

Figure 1:
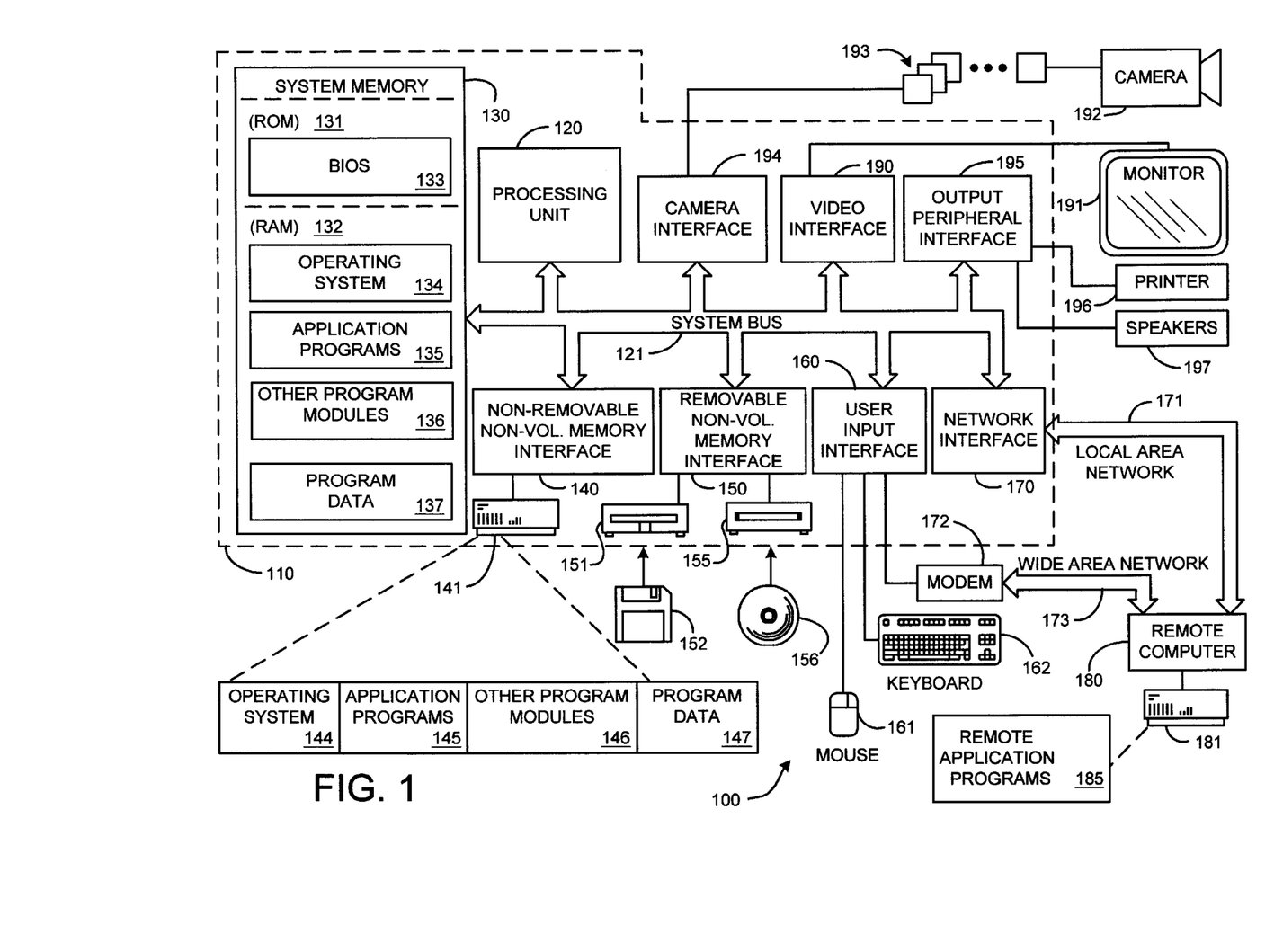
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

System Overview

The system and method according to the present invention uses an arbitrary quadrangle-shaped plane object (e.g., a piece of paper), and a pointer tip (e.g., a fingertip or a pen), to serve as a natural and convenient input device for accurately controlling one or more computer remote displays, based on computer vision techniques.

Figure 2:
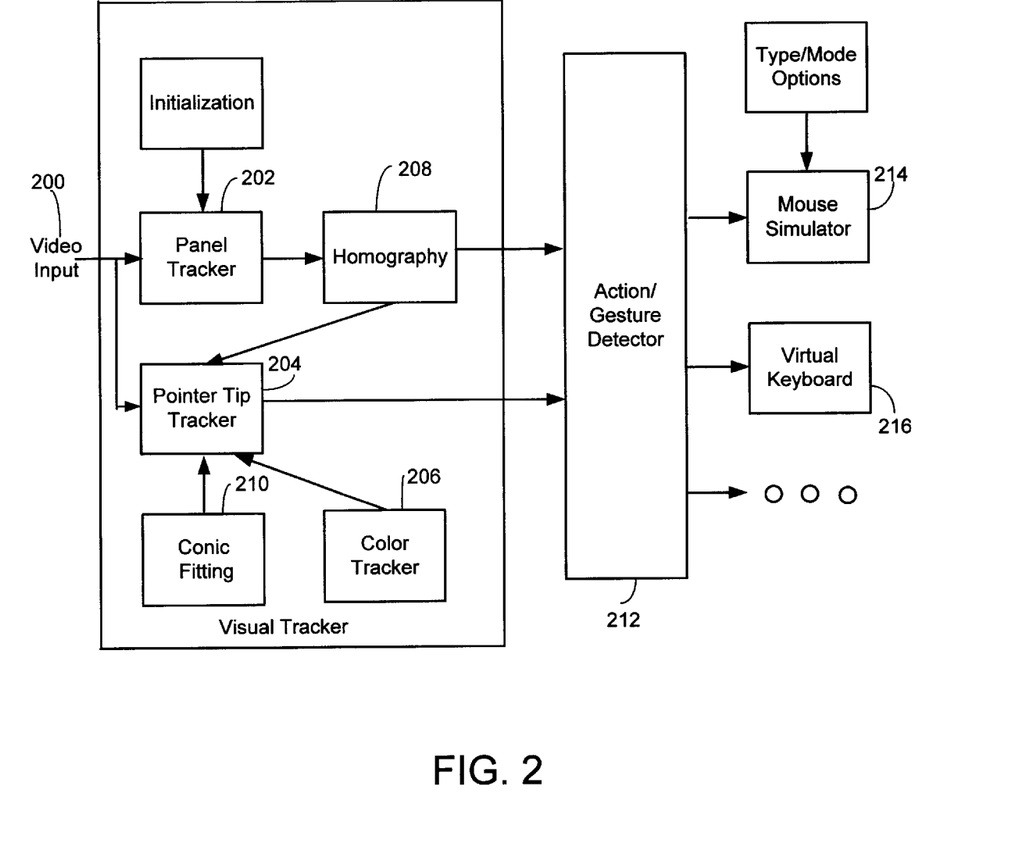
FIG. 2 is a system diagram that depicts exemplary program modules employed in a system according to the present invention.

As shown in FIG. 2, the system consists of panel tracking, pointer tip tracking, homography calculation/updating and action detection/recognition. In the most general terms, video sequences 200 taken by a video camera are analyzed by a panel tracker 202 and a pointer tip tracker 204. The panel tracker 202 tracks an arbitrary quadrangle-shaped plane object by outputting the positions of its four corners. An edge-based dynamical programming technique is employed in the panel tracker to locate these four corners. The edge-based programming technique analyzes the gradient of color intensity in a video frame to locate the edges of the object (herein after referred to as a panel), since the difference in color intensity between the surroundings and the panel should typically be significant. This technique is quite robust and reliable, even if some of the corners of the panel or part of the edges are occluded, because the corners are found by finding the edges of panel and extrapolating to where they intersect to find the corners. At the same time, since the positions of the corners are calculated by intersecting four lines of the quadrangle, the positions can be calculated in sub-pixels, which allows more accurate calculation of the homography 208 which describes the mapping between the panel and the remote display. Through this homography 208, any point on the panel is mapped to the corresponding position on the remote display.

In the system and method according to the present invention, users can use their fingertip as a pointer to control a pointer on a remote display. Consequentially, the tracking of the pointer tip should be as accurate and stable as possible. This is because a small error in the tip position will be magnified in the remote display. This problem of the magnified error of the tip position is solved in the system by representing a pointer tip as a conic (specifically an ellipse) and fitting a parametric conic via a conic fitting module 210 to image observations. In this way, the tip position can also be calculated in sub-pixels such that the error can be reduced. The color tracker 206 plays two roles. The first is to locate the potential tip region through background subtraction when no tip was tracked. It initializes the tip tracker when a potential tip region is found. The second is to use a predefined tip color model (either built manually or learned from data) to help locate the tip in the images.

The current system simulates the clicking/pressing gestures by holding the pointer tip on a position for a prescribed period of time. The message generator in the system gets inputs from the action/gesture detector 212, and issues various mouse and keyboard events according to the different user input methods. Building on these techniques, the system is capable of performing two types of input: virtual mouse 214 and virtual keyboard 216. The position of the pointer tip can be mapped to the remote display such that a cursor can be simulated. A paper with a keyboard pattern printed on it can also be used as a virtual keyboard, by which users can point the keys on the paper to input texts.

Figure 3:
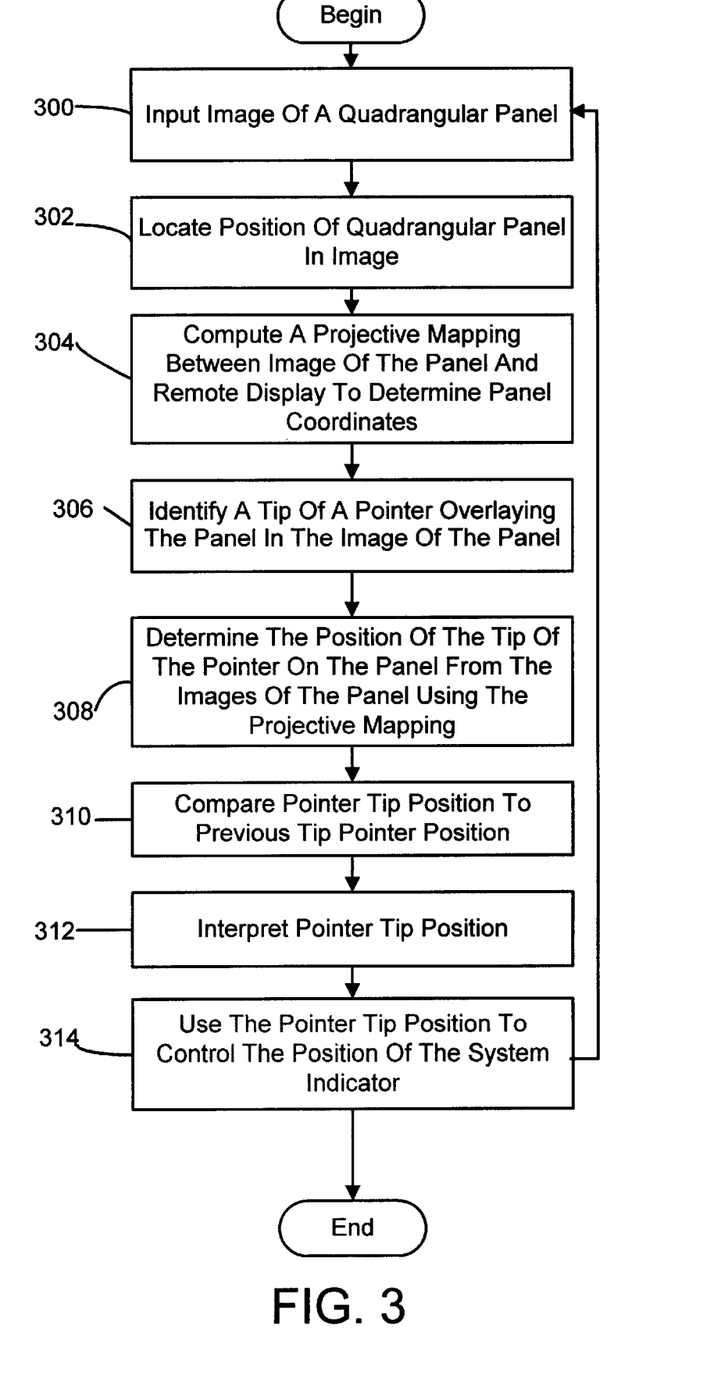
FIG. 3 is a flow diagram depicting a general overview of the system and method according to the present invention.

FIG. 3 depicts a general flow chart of the system and method according to the present invention. As shown in FIG. 3, process action 300, images of the panel and pointer tip are input into the invention. The position of the quadrangular panel is then located in the image (process action 302). A projective mapping between the images of the panel and the remote display are then determined in order to determine the panel coordinates, as shown in process action 304. The pointer tip overlaying the panel is then located (process action 306). As shown in process action 308, the position of the tip of the pointer on the panel is then determined from the images of the panel using the aforementioned projective mapping. The pointer position is then compared to the previous pointer position (process action 310) and the pointer position is interpreted (process action 312) in order to use the pointer position to control the position of the system indicator such as a cursor or keyboard (process action 314).

The following paragraphs provide a more detailed explanation of the system and method according to the present invention.

1.0 Mapping Between Panel and Display

Referring again to FIG. 2, as mentioned previously, to map between the panel and the display, video sequences 200 taken over time are analyzed by a panel tracker 202 and a pointer tip tracker 204. These video sequences are captured using a video camera. The camera is used to capture the movement of both the quadrangle-shaped plane object and the pointer tip.

The setting of the camera can be quite flexible. It can be anywhere as long as the panel is not completely occluded. For instance, it would be possible to mount the camera on the ceiling. The user can rotate, translate and tilt the panel to reach a comfortable pose for use. However, the user should not let the normal of the panel be vertical to the optical axis of the camera. Under some circumstances when the user wants to walk around, a camera can be mounted on top of his head by wearing a hat, or on his shoulders, such that the user can be anywhere to interact with the computer.

Since an arbitrarily quadrangle-shaped panel is used to control the cursor position on the remote display, the mapping between a point on the panel and a point on the display must be known. Furthermore, what is available is an image sequence of the panel which may undergo arbitrary motion (as long as the image of the panel does not degenerate into a line or a point), so the mapping between a point in the image plane and a point on the panel must also be known. It is assumed that the camera provides a perspective projection (pinhole model). As the display, the panel, and the image plane are all planes, both above relationships can be described by a plane perspectivity, as explained below.

Given a point $p=[x, y]^T$ on a plane $\Pi$, $\tilde{p}=[x, y, 1]^T$ can be used to denote its homogeneous coordinates. Then, the plane perspectivity between planes $\Pi$ and $\Pi'$ is described by a 3×3 matrix H such that $$\lambda \tilde{p}' = H \tilde{p}$$

where $\lambda$ is an arbitrary non-zero scalar. This implies that the homography matrix is only defined up to a scale factor, and therefore has 8 degrees of freedom. If four couples of corresponding points (no three of them are collinear) are given, the homography matrix can be determined. It is not difficult to see that the composition of two plane perspectivities is still a plane perspectivity. Thus, the mapping between the image of the panel and the remote display can be described by a homography matrix 206. The composed homography 206 can be easily determined once the four corners of the panel are located in the image (see next section for details). As the dimensions of the display are known, the homography 206 can be computed by mapping each corner of the panel to a corner of the display.

2.0 Tracking the Quadrangle

Figure 4:
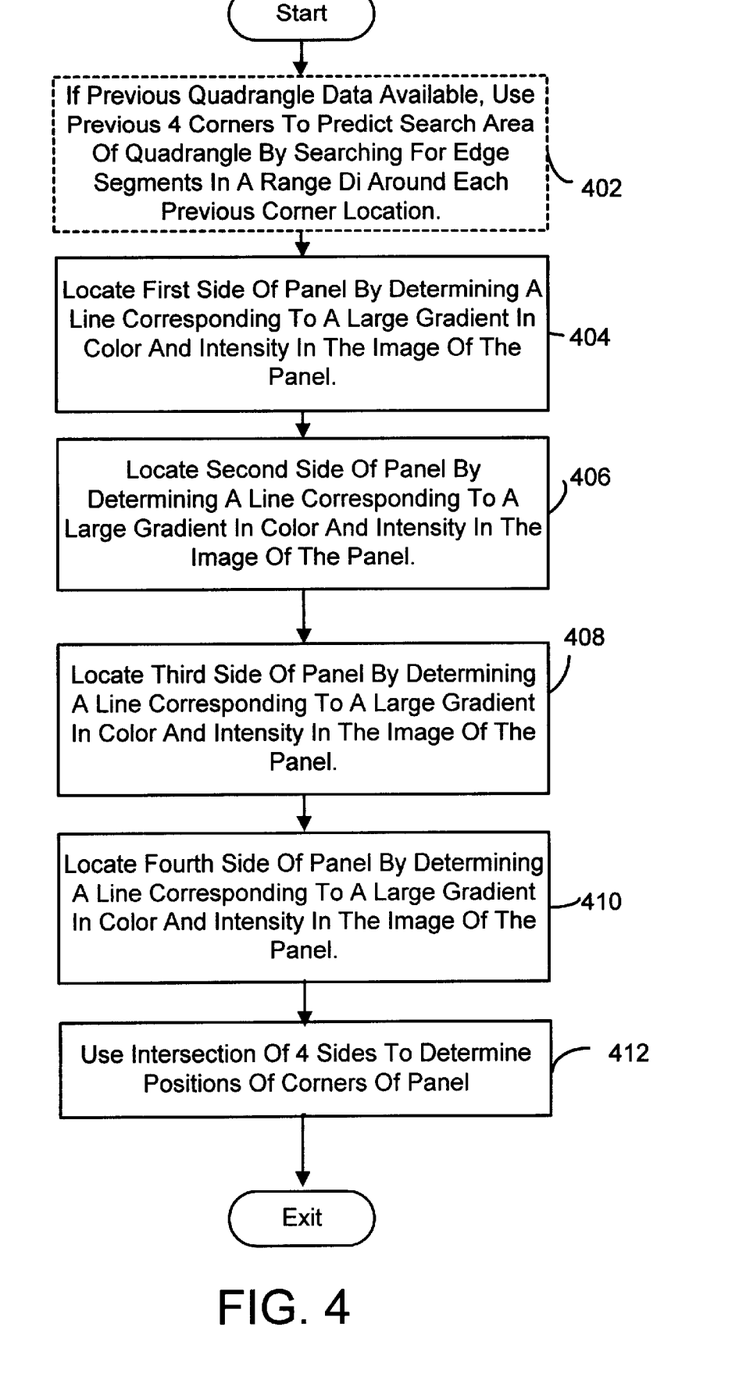
FIG. 4 is a flow diagram depicting how the quadrangular panel is tracked.

This section provides a description of the quadrangle representation and of the quadrangular panel tracking. The system and process according to the present invention sequentially scans a video input frame to locate each side of the quadrangular panel in the input image. Generally, as shown in FIG. 4, if previous quadrangle position data is available, this data is used to predict the search area for searching for the quadrangle (process action 402). The first side of the quadrangle is located by determining a line corresponding to a large gradient in color and intensity in the image of the panel (process action 404), either in the predicted search area or in the entire image. A threshold may be used in determining whether this gradient is large enough to represent a line corresponding to the edge of the panel. The other three sides of the quadrangle are then located sequentially but in the same way (process action 406, 408, 410). Once the four sides of the panel are located, their intersections are taken to be the positions of the four corners of the panel, as shown in process action 412.

2.1 Quadrangle Representation

The image of the panel can be represented by a quadrangle:

$$Q = \{l_1, l_2, l_3, l_4\}$$

where $l_i$ is a side line. It can also be also represented by four corners $Q=\{q_1, q_2, q_3, q_4\}$ with $l_k=q_{k-1}q_k$ (assuming $q_0=q_4$). Each side of the quadrangle in the image is expected to be a set of edge points due to the color gradient and intensity difference between the panel and the background. The appearance of each side is modeled as a random vector $x=\{G, I\}$, where G is the average gradient and I is the average intensity. The distribution of x is assumed to be a Gaussian, i.e., $$x \sim N(\mu_x, \Sigma_x).$$

2.2 Tracking Through Dynamic Programming

At time t, the location of the quadrangle is at $Q(t)=\{q_1(t), q_2(t), q_3(t), q_4(t)\}$, and the appearance of the quadrangle is $x(t)$. The tracking problem can be formulated as a maximum a posteriori problem (MAP):

$$Q^*(t+1) = \arg \max_Q p(Q(t+1) \mid Q(t), x(t), x(t+1))$$

Because the panel motion between successive image frames is limited, it is assumed at time t+1 the four corner points will be in a range $D_i$ around $p_i(t)$, respectively. The above problem can them be approximated by:

$$Q^*(t+1) = \arg \max_Q p(Q(t+1), x(t+1) | Q(t), x(t) : \{D_1, D_2, D_3, D_4\})$$

Here ":" means that $\{D_1, D_2, D_3, D_4\}$ are parameters for the probability. It is further assumed that the size of each search area of $D_i$ is N. Since the four sides of the quadrangle are sequentially connected, this problem can be solved by the dynamic programming technique:

$$Q^*(t+1) = \arg \max_Q \sum_{i=1}^{4} p(Q(t+1), x_i(t+1) | x_i(t),$$

$$Q_i(t) : D_i(q_i(t), q_{i-1}^*(t)))$$

$$= \arg \max_{\{q_k\}} \sum_{i=1}^{4} p(x_i(t+1) | x_i(t), q_i(t), q_{i-1}^*(t))$$

That is, an attempt is made to estimate each side of the quadrangle sequentially by maximizing a suitable criterion as discussed below. In the system and method according to the present invention, the search region for each corner point is approximated by a line segment, instead of a region. This is equivalent to searching for side lines. Corner points are later computed from the intersection of these lines.

Criterion

As mentioned earlier, the appearance of each side line of the quadrangle is modeled by x that contains both the gradient information and the color information. Maximizing the probability above implies to finding a pair of line segments between t and t+1 such that their appearances are closest. This can be done by minimizing the relative entropy between their distributions.

Assuming a Guassian distribution of X and Y, then the relative entropy is as follows:

$$D(X\|Y) = E\left[\lg \frac{p_x(u)}{p_y(u)}\right] = \int p(u) \lg \frac{p_x(u)}{p_y(u)} du$$

$$= \frac{d}{2} \lg \frac{|\sum_y|}{|\sum_x|} - \frac{1}{2} + \frac{1}{2} E\left[(x-\mu_y)' \sum_y^{-1} (x-\mu_y)\right]$$

$$= \frac{d}{2} \lg \frac{|\sum_y|}{|\sum_x|} - \frac{1}{2} + \frac{|\sum_y|}{2|\sum_x|} + \frac{1}{2}(\mu_x - \mu_y)' \sum_y^{-1} (\mu_x - \mu_y)$$

Thus, a symmetric distance metric is determined:

$$D(X, Y) = 2(D(X\|Y+) + D(Y\|X))$$

$$= \frac{|\sum_y|}{|\sum_x|} + \frac{|\sum_x|}{|\sum_y|} + (\mu_x - \mu_y)' \left(\sum_x^{-1} + \sum_y^{-1}\right)(\mu_x - \mu_y) - 2$$

By this means, the best-matched line at time t+1 can be found by $$l_i^*(t+1) = \arg \min_{\{q_i, q_{i-1}\}} D(x(t), x(t+1) : \{q_i, q_{i-1}\})$$

3.0 Tracking a Fingertip

The system and method according to the present invention determines the tip location of a pointer by using a conic curve fitting technique. The invention also uses a method of reinitializing the tracking by using a background subtraction technique.

3.1 Fingertip Representation

Figure 5:
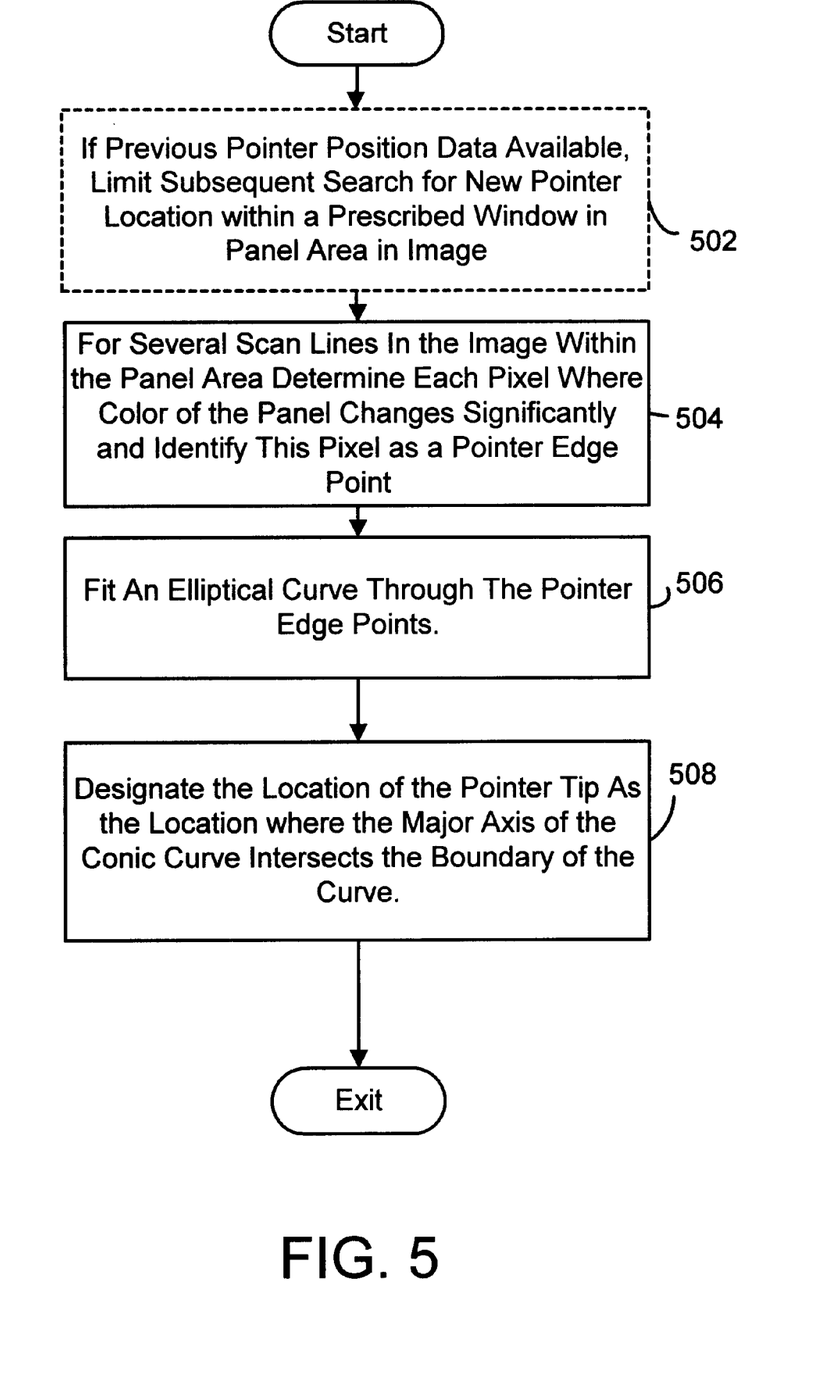
FIG. 5 is a flow diagram depicting how the pointer tip is tracked.

The system allows arbitrary pointer tips, such as fingertips and pens, to be used as long as their color is distinguishable from the panel's color. As shown in FIG. 5, the system optionally uses previous pointer position data when it is available to limit the search area when trying to determine the new pointer tip position, as shown in process action 502. As shown in process action 504, the process and system according to the present invention scans several scan lines within the panel area of the frame being analyzed to determine each pixel where the color and intensity of the panel change significantly. Each of these pixels is then identified as a pointer edge point. That is, the edge points of the pointer tip are held to be those areas where the color of the image of the panel changes significantly. Once the edge points are found, a conventional conic curve-fitting technique is used to fit an ellipse to the edge points (process action 506). The tip of the pointer is then found by finding where the major axis of the ellipse intersects the aforementioned ellipse, as shown in process action 508.

Figure 6:
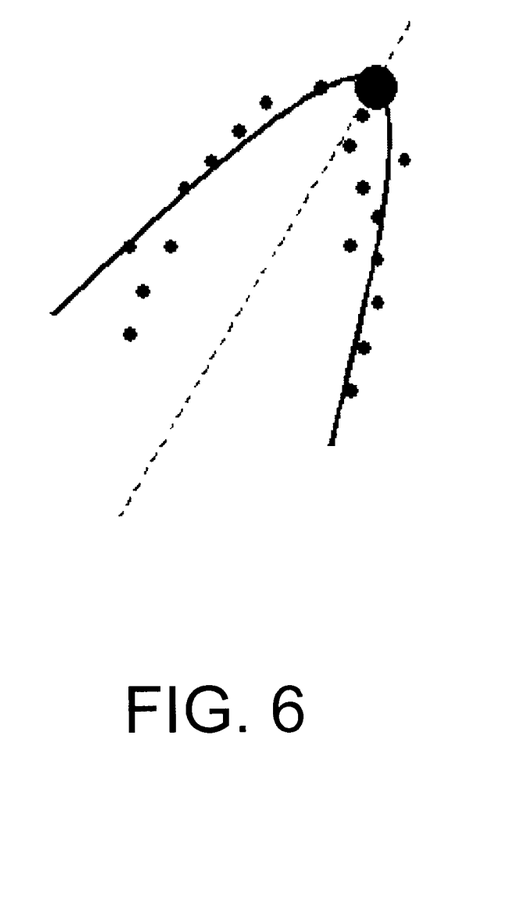
FIG. 6 is a diagram depicting the edge points of the pointer tip with a conic curve fit to them and the major axis of the conic determining the pointer tip location.

More specifically, as shown in FIG. 6, a pointer tip, such as a fingertip, can be represented, locally around the tip, by a conic $$a_1 x^2 + a_2 y^2 + a_3 xy + a_4 x + a_5 y + 1 = 0$$

Given a set of positions $\{(x_1, y_1), \ldots, (x_n, y_n)\}$ of edge points of the pointer tip, a conic can be fitted to such data by a least-squares estimation. This will give $$\begin{bmatrix} x_1^2 y_1^2 & x_1 y_1 & x_1 y_1 \\ & \vdots & \\ x_n^2 y_n^2 & x_n y_n & x_n y_n \end{bmatrix} \begin{bmatrix} a_1 \\ \vdots \\ a_5 \end{bmatrix} = \begin{bmatrix} -1 \\ \vdots \\ -1 \end{bmatrix}$$

Concisely, this equation can be written as Ma=b. So, the least-squares solution of a is given by:

$$a^* = (M^T M)^{-1} M^T b$$

Once the ellipse is known, the tip can be determined as one of the intersections of the ellipse with the major axis of the ellipse.

3.2 Tracking the Pointer Tip

There are two methods of expediting the process of finding the pointer tip in an image. These methods take advantage of the fact that by looking at previous images, it is possible to determine about where in an image the pointer is. The first of these short cut methods involves a Kalman filtering technique and the second involves a background subtraction method.

3.2.1 Kalman Filtering Technique

Assuming the position of the tip at time t is p(t), the Kalman filtering technique can be employed to predict the tip position $\bar{p}(t+1)$ at time t=1. In a small window, for example 30×30 pixels, as many edge points as possible are identified that probably belong to the edge of the tip. This is accomplished by thresholding the gradient and taking advantage of the color of the previous edge of the tracked tip. After that, an ellipse can be fit to these edge pixels to solve the exact tip $\bar{p}(t+1)$ for time t+1.

3.2.2 Maintaining Background and Re-initialization

An alternate expedited method of detecting the pointer tip location employs a scheme of automatic tracking initialization and tracking recovery.

Figure 7:
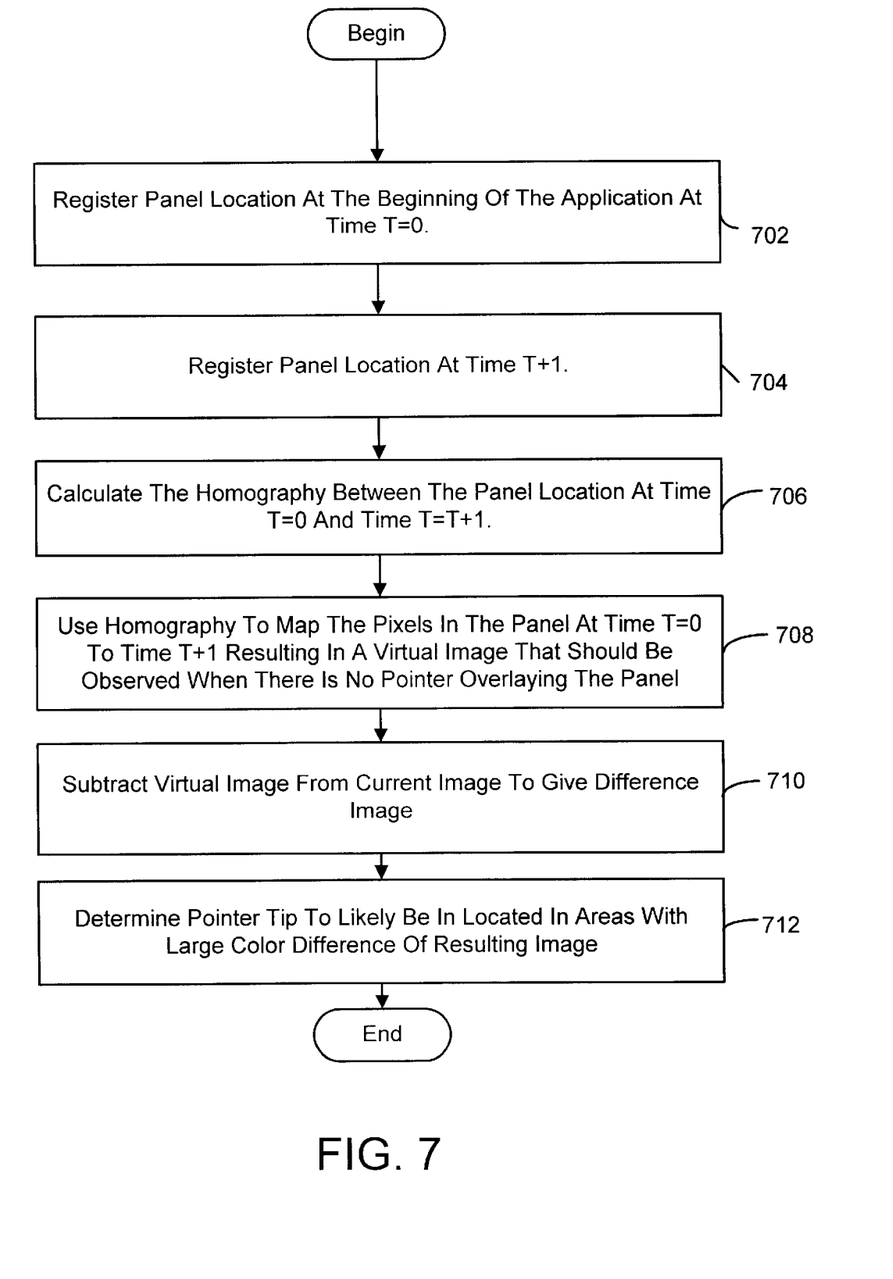
FIG. 7 is a flow diagram depicting the re-initialization technique employed by the system and method according to the present invention.

More specifically, as shown in FIG. 7, in process action 702, the panel is registered at the beginning of the application, i.e., the position of the panel Q(0) at time 0 is known. The location of the panel is then registered at a subsequent time t, as shown in process action 702. Since at time t, the system can track the panel position Q(t), the homography H(t) between Q(0) and Q(t) can be easily calculated (process action 706). As shown in process action 708, through the homography H(t), the pixels $p_t(0)$ in the panel at time 0 are mapped to the panel at time t as $p_b(t)$ by:

$$\tilde{p}_b(t) = H(t)\tilde{p}_t(0)$$

This results in a virtual image $I_0(p_b(t))$ of the panel that should be observed if there is no pointer tip overlaying it. Subtracting $I_0(p_b(t))$ from the current image give a difference image, process action 710. The pointer tip is then determined to likely be located in areas with large color difference in the difference image (process action 712).

4.0 Action Detection and Recognition

The current system and method simulates clicking and pressing of the buttons of a mouse (or trackball, etc.) by holding the pointer tip in the same position for a prescribed period of time. As such, users can use their fingertip to simulate this clicking and pressing. The message generator in the system gets inputs from an action detector, and issues various mouse and keyboard events, according to the different user input methods. Building on top of these techniques, the system is capable of performing two types of input: virtual mouse and virtual keyboard. The position of the pointer tip can be mapped to the remote display such that a cursor can be simulated. Or a paper with a keyboard pattern printed on it can also be used as a virtual keyboard, by which users can point the keys on the paper to input text.

The present system and method also supports two "mouse button" pressing modes (clicking mode and dragging modes) and two "mouse motion" types (absolute and relative).

4.1 Two Mouse Pressing Modes

The system has two mouse button pressing modes: mode I (clicking mode) simulates the left button down then up automatically and mode II (dragging mode) simulates the left button down until released. In one embodiment, clicking/pressing is simulated by holding the pointer tip in position for a period of time, say 1 second. A state variable S maintains two states: UP and DN, to simulate the two natural state of a button.

The variable S is initialized to be UP. In the clicking mode (mode I), when the system detects that the pointer tip has been at a fixed place for, say, 1 second (or other pre-specified duration), the state variable S is set to DN. After 0.1 second, the state variable S will be automatically set to UP to simulate button release. Appropriate mouse events are generated, and a clicking action is performed.

Obviously, the clicking mode (mode I) has very limited ability of dragging, since the release is automatic. To simulate dragging, mode II uses another state variable, D, to memorize the flip of clicking. When the system detects that the pointer tip has been at a fixed place for, say, 1 second (or other pre-specified duration), the D variable changes its state (from D UP to D DN or from D DN to D UP). When the D-state change from D UP to D DN is detected, a pressing action is detected; when the D-state change from D DN to D UP is detected, a releasing action is detected. Thus, an object in the display can be selected and dragged to a different place.

Note that the clicking event can also be triggered in the dragging mode if the pointer tip stays in the same location twice longer. In one embodiment of the present invention, an icon is provided in a menu bar. By clicking on this icon, the system switches between the dragging and clicking modes.

4.2 Two Mouse Motion Types

The system can simulate two mouse motion types: absolute and relative. The motion type used would typically be application dependent. In the absolute type, the panel will be mapped to the whole remote display, such that each point in the panel will be mapped to the corresponding point in the display. As previously discussed, this motion type needs very accurate tracking, since a small tracking error of the panel and pointer tip will be magnified.

The relative motion type is much less sensitive to the tracking accuracy, since the cursor is controlled by the relative motion of the pointer tip. Assume the motion direction of pointer tip is $d_p(t)$ at time t. The moving direction of the cursor will be $$d_d(t) = H(t)d_p(t).$$

The speed of cursor motion is determined by the velocity of the pointer tip, i.e., $$\Delta_d = \alpha \|v_p\|,$$

where α controls the scale of the cursor speed on the display. The relative motion type provides smooth movement of the cursor with small α, due to the non-magnification of tracking error. There could be other relative mouse motion alternatives as well. For instance, the panel can be mapped to a window area centered at a previous cursor position on the remote display. In this method, the center of the panel corresponds to the previous cursor position. When the pointer tip moves from center to left, the cursor will move left. Obviously, the window area could be smaller than the panel in the image, such that the tracking error can be even minimized.

5.0 Working Examples

Based on the system and method according to the present invention, several working examples were made to demonstrate the capacity of the system. In this section, three such examples are explained: controlling a calculator, drawing a picture with a finger, and inputting text without using any keyboard.

5.1 Controlling a Calculator

Figure 8:
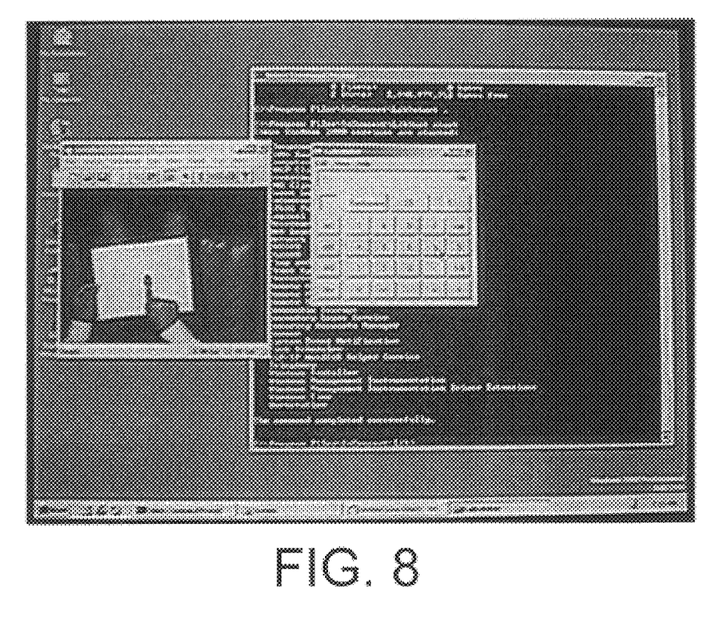
FIG. 8 is a screen image showing an exemplary implementation of a working example according to the present invention wherein a calculator is depicted on the remote display.

The example of controlling a calculator demonstrated the accuracy and stability of the system. The calculator, with around 30 buttons, took a very small part of the area of the remote display. In this working embodiment, a user freely used his fingertip to click any buttons or menus of the calculator, as shown in FIG. 8. The tracking error was less than 1 pixel, and the motion of the cursor was very smooth.

5.2 Finger Painting

Figure 9:
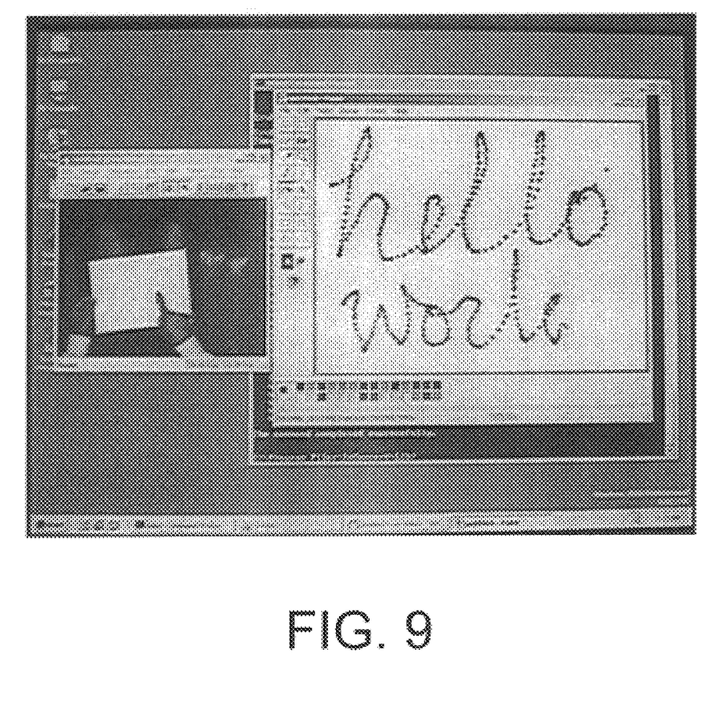
FIG. 9 shows an exemplary implementation of a working example wherein a user paints using the present invention.

The finger painting application demonstrated different mouse button pressing modes. In Paint®, a Microsoft Windows® application, a user used his finger to select tools and draw. A stability study showed that users learned quickly how to draw a picture and control the remote display with their finger using the system and method according to the present invention. FIG. 9 shows a snapshot of the display while a user was finishing painting "hello world". The left window displays the panel and the hand viewed from the camera.

5.3 Virtual Keyboard

Figure 10:
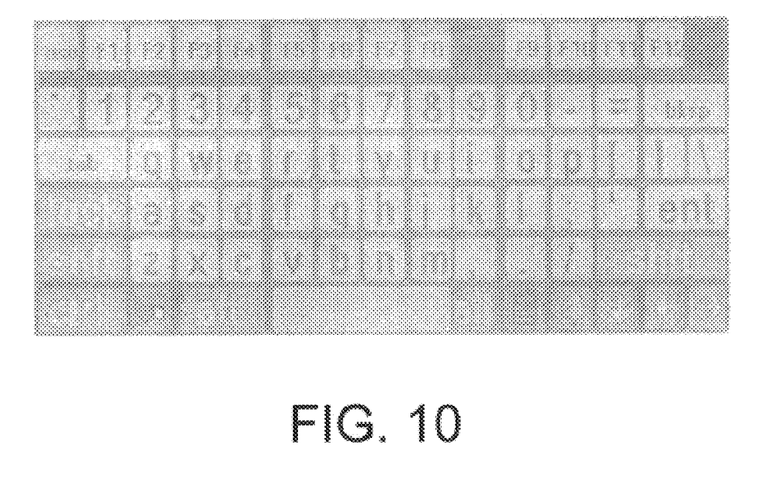
FIG. 10 shows an exemplary implementation of a working example according to the present invention wherein a keyboard is simulated to control the remote display.
Figure 11:
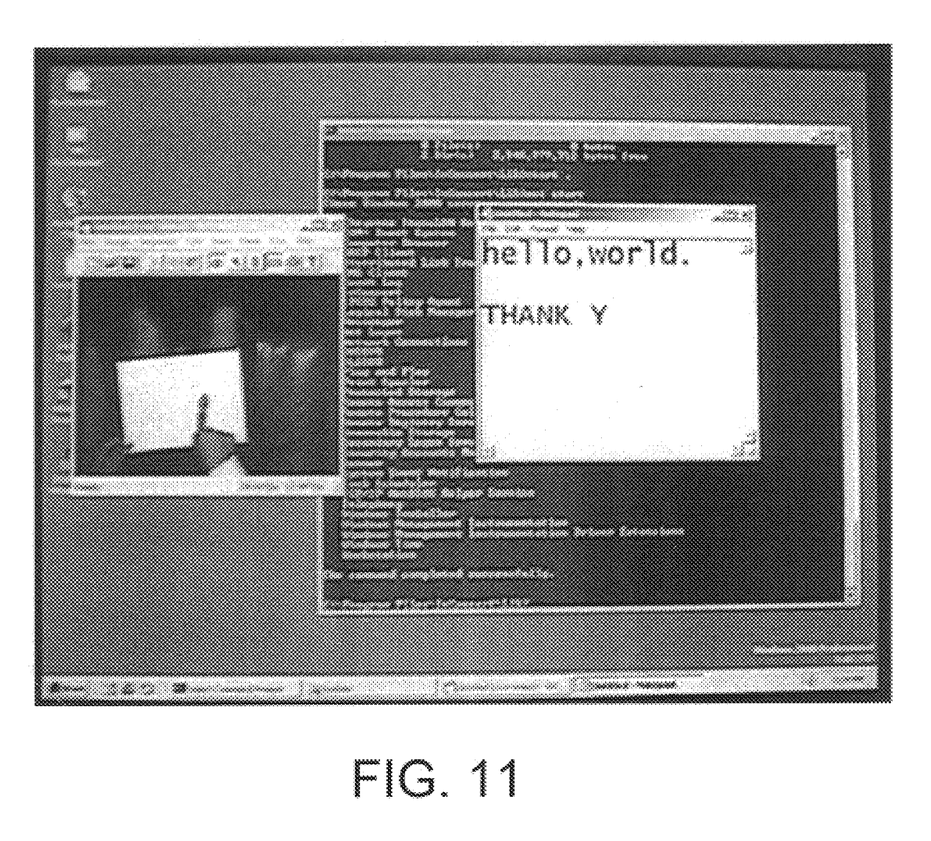
FIG. 11 shows the keyboard of FIG. 10 being used.

The virtual keyboard application demonstrated that the physical keyboard can be replaced by a printed virtual keyboard using the system and method according to the present invention. A keyboard pattern was printed on the panel, which is shown in FIG. 10. When a user pointed to any of the keys on the panel, a key-down message was sent to the operating system, such that the current active application received such key. For example, Microsoft Corporation's Windows Notepad® was used to receive text input by the user. FIG. 11 shows a snapshot of the display while a user was inputting "hello world. THANK YOU" with the virtual keyboard.

There are many examples of how the system and method according to the present invention could be used. For instance, in a smart room, the user may want to control a remote, large display, but he is on a sofa instead of in front of the computer such that a mouse and keyboard may not be accessible. In such a situation, he may pick up an arbitrary paper and move his finger or pen on the paper to drive a cursor.

In another example, several people may be having a discussion in a meeting room using a large display. They may need to draw some pictures to show their ideas. However, it is unrealistic to facilitate every user with a mouse and a keyboard. Again, each user may pick up any paper and use their fingers to draw their ideas which will be shown on the large display. By this means, a more immersive discussion can be achieved.

In yet another example, in a large lecture room, the lecturer may need to write down something on a small whiteboard. However, the audience, sometimes a remote audience, may not be able to see clearly what he writes. Due to the constraints of the bandwidth, it may not be feasible to broadcast a video of the writing. In this situation, the present invention could be used to analyze what the lecturer writes and display it on a remote display or displays.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

Wherefore, having thus described the present invention, what is claimed is:

1. A computer-implemented process for using a quadrangular panel and a pointer overlaying the panel to control a remote display, comprising using a computer to perform the following process actions:
   inputting an image of a quadrangular panel and a pointer;
   locating the position of the quadrangular panel in said image;
   computing a projective mapping between the coordinates of said image and the coordinates of at least one remote display;
   locating a tip of the pointer in said image; and
   determining coordinates on the remote display corresponding to the location of the tip of the pointer on the quadrangular panel as depicted in the image using said projective mapping.

2. The process of claim 1, wherein the process action of locating the position of the panel in said image comprises the process action of using a color intensity gradient to locate the edges of the panel in said image.

3. The process of claim 2, wherein the process action of locating the position of the panel in said image comprises the process action of using previous available panel position data to limit the search area of the panel in the image by searching for panel edge segments in a prescribed range about each previous panel corner.

4. The process of claim 2, wherein the process action of locating the position of the panel comprises finding the location of the corners of the panel by finding the location where the edges of the panel intersect.

5. The process of claim 4, wherein the location of the corners are defined in terms of sub-pixels.

6. The process of claim 5 further comprising pointer tip tracking reinitialization process actions comprising:
   registering the panel location in a first image at time T=0 where T is the beginning of an application;
   registering the panel location in a second image at some subsequent time T+1;
   calculating the homography between the panel location in said first and second images at time T=0 and time T+1;
   using the homography to map image pixels in the panel at time T=0 to time T=T+1 resulting in a virtual image that would be observed when there is no pointer overlaying the panel;
   subtracting the virtual image from a third input image to give a difference image;
   determining the areas with large color change in the difference image; and
   searching for the tip pointer by fitting an elliptic curve to the edges.

7. The process of claim 2, wherein the process action of locating the position of the quadrangular panel in said image comprises the process actions of:
   locating the four sides of the panel by scanning the image and determining the four lines corresponding to the largest gradients in color and intensity in the image of the panel over a prescribed threshold; and
   locating the four corners of the panel in the image by specifying each corner as an intersection of two sides.

8. The process of claim 1, wherein the process action of computing a projective mapping between the coordinates of said image and the coordinates of at least one remote display comprises:
   determining a homography from at least four pairs of image-remote display correspondences.

9. The process of claim 8, wherein the process action of determining a homography from at least four pairs of image-remote display correspondences comprises a process action of mapping the four corners of the panel in the image to the four corners of the at least one remote display.

10. The process of claim 9 wherein the process action of determining a homography from at least four pairs of image-remote display correspondences comprises a process action of mapping the four corners of the panel in the image to the four corners of an area less than the at least one remote display.

11. The process of claim 1 wherein the action of locating the pointer tip comprises the actions of:
   scanning the image in a horizontal fashion to determine the pixel location where the color intensity of the panel changes significantly on a scan line by scan line basis starting from the top of the identified panel location in the image;

designating the location in each scanned line where the color intensity of the panel changes significantly as a pointer edge point;

fitting an elliptical curve through the pointer edge points;

determining a major axis of the elliptical curve; and designating the location of the pointer tip as the location in the image where the major axis of the elliptical curve intersects the boundary of the elliptical curve.

12. The process of claim 11 wherein the action of locating the location of the pointer tip comprises the action of using previous pointer tip position data to limit the search for the new pointer tip location to within a prescribed area.

13. The process of claim 12 wherein the prescribed area is 30 by 30 pixels.

14. The process of claim 11 further comprising the process action of using a Kalman filter to refine indicator tip location.

15. The process of claim 11 wherein the process action of determining the position of the tip of the indicator on the panel from the images of the panel comprises an action of mapping the location of the pixel of the image corresponding to the indicator tip to the corresponding remote display coordinates using the projective mapping.

16. The process of claim 11 wherein the location of the pointer tip is defined in sub-pixels.

17. The process of claim 1 wherein the process action of determining coordinates on the remote display corresponding to the location of the tip of the pointer on the quadrangular panel as depicted in the image using said projective mapping further comprises the process action of determining the coordinates on more than one remote display.

18. The process of claim 1 further comprising the process actions of comparing the pointer tip location to a previous pointer tip location;

interpreting the pointer tip location; and using the pointer tip position to control the position of a system indicator.

19. The process of claim 18 wherein the process action of interpreting the pointer tip location comprises interpreting the pointer tip location to simulate a mouse and wherein said system indicator is a mouse curser.

20. The process of claim 18 wherein the process action of interpreting the pointer tip location comprises the process action of interpreting the pointer tip location to simulate a keyboard and wherein said system indicator is a keyboard.

21. The process of claim 18 wherein the process action of interpreting the pointer tip location to simulate a mouse comprises the process actions of simulating two mouse button pressing modes; and simulating two mouse motion types.

22. The process of claim 21 wherein the process action of simulating two mouse button pressing modes comprises:

simulating a clicking mode which simulates a left mouse button down and then up automatically; and simulating a dragging mode which simulates the left button down until released.

23. The process of claim 22 wherein the clicking mode is simulated by the following process actions:

designating a state variable, S, that maintains two states, up and down, to simulate the nature state of a button;

initializing the state variable S to up;

setting the state variable S to down when the pointer tip location has been at a fixed place for a prescribed first period of time to simulate mouse button depression; and automatically setting the state variable to S to up after a second prescribed period of time to simulate mouse button release.

24. The process of claim 23 wherein the first prescribed period of time is 1 second and the second prescribed period of time is 0.1 second.

25. The process of claim 23 wherein the dragging mode is simulated by the following process actions:

designating a state variable, D, that maintains two states, up and down, to simulate the nature state of a button;

initializing the state variable D to the opposite of the state of variable S;

changing the state variable D to when the pointer tip location has been at a fixed place for a prescribed third period of time and wherein when a D-state change from up to down is detected a mouse button pressing action is simulated, and when a D-state change from down to up is detected a mouse button pressing releasing action is simulated.

26. The process of claim 25 wherein the third prescribed period of time is 1 second.

27. The process of claim 21 wherein the absolute mouse motion is simulated by mapping the panel to the whole at least one remote display.

28. The process of claim 21 wherein the relative mouse motion is determined by the process action of measuring the velocity of the pointer tip.

29. A system for using a quadrangular panel and a pointer overlaying the panel to control a remote display using a camera, the system comprising:

a camera positioned so as to have a view of the quadrangular panel;

a general purpose computing device; and a computer program comprising program modules executable by the computing device, wherein the computing device is directed by the program modules of the computer program to, input images of the panel from the camera;

locate a quadrangular panel in said images;

compute a projective mapping between the images and the coordinates of at least remote display to determine the remote display coordinates of a point in the images;

locate a pointer tip superimposed on the panel in the images; and determine the coordinates in the images on the remote display corresponding to the location of the tip of the pointer on the panel as depicted in the image using the projective mapping.

30. The system of claim 29, wherein the program module for computing a projective mapping comprises a sub-module for determining a homography from at least four pairs of image-remote display correspondences.

31. The system of claim 30, wherein the sub-module for determining a homography comprises a module for identifying the screen coordinates of the four corners of the remote display and detecting corresponding points on an image of the panel via an edge detection procedure.

32. The system of claim 31, wherein the module for locating the four corners of the image of the panel comprises:

locating the four sides of the panel by determining four lines corresponding to the four largest gradients in color and intensity in the image of the panel; and locating the four corners of the panel in the image by specifying each corner as the location of the intersection of two lines.

33. The process of claim 29 further comprising a process action for using the determined position of the tip of the indicator to control the position of a system indicator.

34. A computer-readable medium having computer-executable instructions for a vision-based gesture interface to control a remote display using a camera, said computer-executable instructions comprising:
   inputting an image of a quadrangular panel and a pointer;
   locating the position of the quadrangular panel in said image;
   computing a projective mapping between the coordinates of said image and the coordinates of at least one remote display;
   locating a tip of the pointer in said image; and
   determining coordinates on the remote display corresponding to the location of the tip of the pointer on the quadrangular panel as depicted in the image using said projective mapping.

35. A system for providing a mobile input device comprising:
   a video input of a quadrangular-shaped panel;
   a panel tracker which tracks said quadrangle-shaped panel by outputting the positions of its four corners;
   a pointer tip tracker that identifies the location of a pointer on said panel;
   an action/gesture detector that detects the location of the pointer on the panel;
   and a remote display that is controlled by said panel tracker, said pointer tracker and said action detector.

36. The system of claim 35 wherein the pointer tip location coordinates are mapped to the coordinates of said remote display using a homography.

37. The system of claim 35 wherein said pointer tip tracker further comprises:
   a curve fitter that fits an ellipse to the edge points of the pointer tip.

38. The system of claim 35 wherein said pointer tip tracker further comprises a color tracker.

39. The color tracker of claim 38 wherein the color tracker locates a potential pointer tip region that matches the predefined color tip model when no tip is being tracked.

40. The color tracker of claim 38 wherein the color tracker further comprises a predefined color tip model to help locate said tip in said image.

41. The color tracker of claim 38 wherein the color tracker further comprises a color tip model learned from previous pointer tip location data to help locate said tip in said image.

* * * * *